United States Patent [19]

Kaufman

[11] Patent Number: 5,192,106
[45] Date of Patent: Mar. 9, 1993

[54] COMPACT DISC HANDLING DEVICE
[75] Inventor: Craig A. Kaufman, Studio City, Calif.
[73] Assignee: I.A.F. Enterprises, Inc., Beverly Hills, Calif.
[21] Appl. No.: 858,426
[22] Filed: Mar. 24, 1992

Related U.S. Application Data

[63] Continuation of Ser. No. 534,027, Jun. 4, 1990, abandoned.

[51] Int. Cl.⁵ ............................................. B25B 9/02
[52] U.S. Cl. ................................... 294/99.2; 294/16; 294/33; 294/93
[58] Field of Search .................... 294/3, 10, 11, 12, 16, 294/33, 34, 93, 97, 99.2, 902

[56] References Cited

U.S. PATENT DOCUMENTS

| | | | |
|---|---|---|---|
| 157,165 | 11/1874 | Ellsworth | 294/33 |
| 209,898 | 11/1878 | Shinn | 294/33 X |
| 388,083 | 8/1888 | Smith | 294/33 |
| 393,223 | 11/1888 | Elliott | 294/97 X |
| 485,944 | 11/1892 | Jones | 294/97 |
| 796,642 | 8/1905 | Hall | 294/97 X |
| 823,411 | 6/1906 | Jones | 294/97 |
| 1,035,728 | 8/1912 | Peck | 294/97 |
| 1,169,955 | 2/1916 | Hammond | 294/93 |
| 1,202,615 | 10/1916 | Tuthill | 294/33 |
| 1,250,500 | 12/1917 | Pipp | 294/93 X |
| 2,316,306 | 4/1943 | Wyman | 294/97 X |
| 2,505,289 | 4/1950 | Haslett | 294/99.02 X |
| 2,541,819 | 2/1951 | Hudson | 294/99.02 X |
| 2,613,979 | 10/1952 | Stillabower | 294/34 |
| 3,119,597 | 1/1964 | Stephens | 294/16 X |
| 3,219,375 | 11/1966 | Van Pelt | 294/16 |
| 4,330,936 | 5/1982 | Swarth | 294/99.2 X |
| 4,432,577 | 2/1984 | Equitz, Jr. et al. | 294/16 |
| 4,595,221 | 6/1986 | de Geus et al. | 294/16 |
| 4,634,166 | 1/1987 | Pool | 294/93 X |
| 4,662,667 | 5/1987 | Gilligan et al. | 294/16 |
| 4,717,190 | 1/1988 | Witherspoon | 294/33 X |
| 4,726,615 | 2/1988 | Goldberg | 294/16 |
| 4,781,408 | 11/1988 | Hernandez | 294/99.02 |
| 4,831,905 | 5/1989 | Murchison | 294/97 X |
| 4,964,663 | 10/1990 | Jermyn | 294/99.2 X |
| 4,986,586 | 1/1991 | Eilrich et al. | 294/99.2 X |
| 4,997,224 | 3/1991 | Pierce | 294/99.2 X |

FOREIGN PATENT DOCUMENTS 0542016 of 1932 Fed. Rep. of Germany ... 294/99.02

OTHER PUBLICATIONS

A. R. Cox and J. R. Holloway, Flexible Disk Handling Tool, Oct. 1977, pp. 1979-1981 of vol. 20, No. 5, IBM Technical Disclosure Bulletin.

Primary Examiner—Charles A. Marmor
Assistant Examiner—Dean J. Kramer
Attorney, Agent, or Firm—Spensley Horn Jubas & Lubitz

[57] ABSTRACT

A device for handling compact discs which can hold the compact disc either at its outer edge or at its aperture edge. The device includes first and second opposing arms. Each arm having a free end, a groove portion adjacent the free end for receiving the outer edge of a disc and a group portion adjacent the free end for receiving the inner edge of a disc.

17 Claims, 7 Drawing Sheets

COMPACT DISC HANDLING DEVICE

This is a continuation of application Ser. No. 07/534,027 filed on June 4, 1990, now abandoned.

BACKGROUND OF THE INVENTION

1. Field of the Invention

The present invention relates to a device for handling discs, especially those for audio compact disc players.

2. Description of the Related Art.

Compact audio discs contain digital audio information. For optimal performance and a long lifetime of usage, it is best to avoid handling a compact disc with ones hands to thereby eliminate fingerprints and avoid potential damage.

Compact discs are stored in a standard box. Handling is necessary to transfer a compact disc from its box to the compact disc player carousel and then back again to the box. Handling of the disc is also necessary when the disc is being cleaned, or when the disc is merely being held while the user is searching for the disc storage box.

Various tools have been developed for handling objects which cannot or should not, for various reasons, be touched with one's fingers.

One class of handling devices consists of tongs designed for handling spittoons. Some of these are shown in U.S. Pat. No. 113,822 to Walker and Lilly, U.S. Pat. No. 116,226 to Seipt, and U.S. Pat. No. 388,083 to Smith. Each of these tongs is used to grasp the inside rim of a spittoon in order to transport it. The tongs consist of two opposing arms attached at one end. Curved "lips" on the end of each arm of the tongs provide a secure grip on the spittoon. In some variations of this type of handling device, the arms of the tongs are resilient. In operation, the arms are first pressed towards each other using hand pressure and inserted into the spittoon. Then, the arms spring outward towards the inner rim, holding the spittoon firmly while it is being lifted and moved.

Another type of handling device is a plate or pan holder. This device is primarily used to handle hot, circular food containers. Some patents showing these are U.S. Pat. No. 1,156,138 to Gates, U.S. Pat. No. 1,202,615 to Tuthill, U.S. Pat. No. 1,499,959 to Wernet, U.S. Pat. No. 2,023,521 to Furnas, and U.S. Pat. No. 2,236,454 to Stambaugh. In each of these patents, the handling device is used to grasp the outside rim of the plate or pan, using either hand pressure or spring action to maintain a tight grip. The handling device consists of two arms attached at one end. Most of these references show some type of groove or channel in each arm, so that both the top and bottom of the plate rim are held securely as the plate slides in between the two arms.

A paper bag spreader is described in U.S Pat. No. 2,505,289 to Haslett. The spreader is a tong consisting of two arms attached with a spring at one end. The ends of the arms are pressed together and placed into the mouth of a bag. Spring action forces the arms apart, spreading the bag open. However, the spreader contains no grooves or channels in its arms and is not suitable for handling a disc-like object.

A record handling device is described in U.S. Pat. No. 3,219,375 to Van Pelt. It consists of two resilient, semi-circular arms which meet to form a handle at one end. There are grooves on the end of each arm of the record handling device. Inward spring action allows a tight grip of the record. The arm is adjustable to two positions, allowing both horizontal removal of a record from its record cover and vertical removal of a record from a phonograph.

Various handling devices are necessary in the electronics industry, where fragile materials must be handled with care. U.S. Pat. No. 4,009,899 to Johnson describes wafer tongs for gently lifting fragile silicon wafers. U.S. Pat. No. 4,781,408 to Hernandez shows a hand tool for removing the cover from an electronic circuitry package. This patent shows tongs including two arms with a "lip" or groove at each end which is used to grasp the outer edge of a package cover. IBM Technical Bulletin, Vol. 20 No. 5, October 1977 describes flexible handling devices for floppy computer disks. One such handling device is a rod-shaped tool which is equal in diameter to a central hole in the floppy disk. It is compressed and inserted into the central hole. Outward pressure from the tool onto the disk holds the disk in place while it is being moved. This handling device does not include any groove or lip.

U.S. Pat. No. 4,726,615 to Goldberg is directed to a device for handling compact audio discs and the like. It contains a central post used to disengage the compact disc from the resilient fingers which hold it in place in its storage box, two flexible arms which can grasp the outer edge of a disc, and two spring-loaded plungers. The first plunger is pressed down, actuating the plug and engaging the arms about the compact disc rim. To release the compact disc, the second plunger is depressed to release the grip of the arms on the rim. This device is unwieldy, complicated, has many moving parts and is potentially difficult and expensive to manufacture.

Other U.S. patents which are related to the field of handling devices include: 981,345 to Anderson; 2,232,330 to Casselberry; 2,541,819 to Hudson; 2,839,325 to Jeanfavre, and 3,558,169 to Onanian.

SUMMARY OF THE INVENTION

It is to the goal of providing a device for handling audio compact discs, and the like, that embodiments of the present invention are directed. It is a further goal of embodiment of the present invention to provide such a device which is easy to use and is of simple and economical construction.

These goals are achieved in a handling device which includes tongs having first and second flexible arms. The free end of each arm includes in it (or a body attached to the free end) a groove formed therein of sufficient size to receive the outer edge of a compact disc or the disc edge defining the central disc aperture. Preferably the portion of the free end containing the groove is small enough so that when the free end of both arms are squeezed closely adjacent to each other, the portion of the free ends containing the groove can fit within the aperture of the compact disc, with a portion of the disc edge defining the central disc aperture positioned within a portion of the grooves of the tong free ends. Alternatively, the tong arms can be spread apart sufficiently so that a portion of the outer disc edge of the compact disc is positioned within a portion of the grooves of the tong free ends. The handling device can then be used to grasp the compact disc either from its outer edge or from its aperture edge for handling and transport merely by flexing the arms of the tongs.

DESCRIPTION OF THE PREFERRED EMBODIMENT

Figures 1, 2:
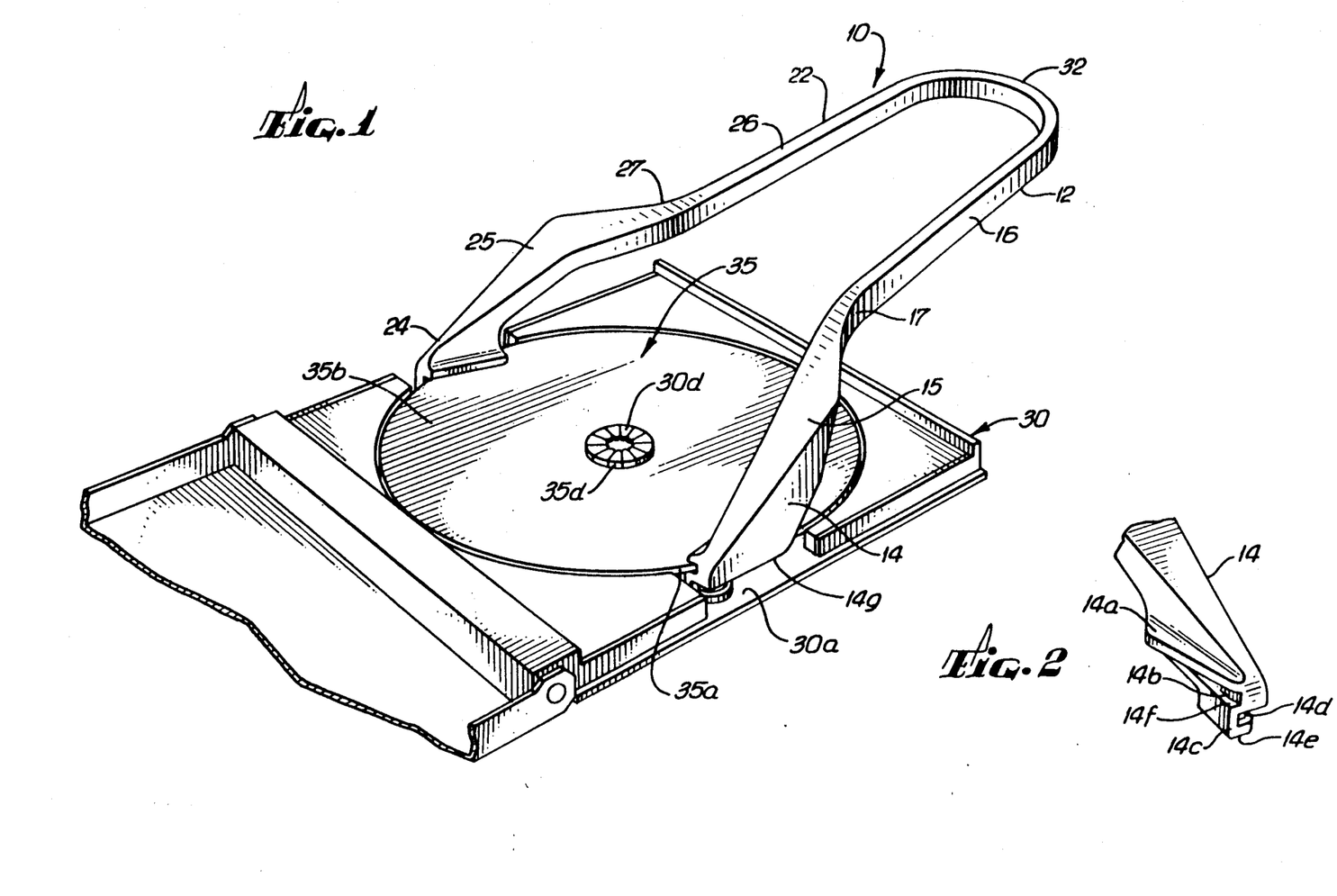
FIG. 1 is a front perspective view of one embodiment of the present invention engaging the outer disc edge of a compact disc which is positioned in a compact disc box.
FIG. 2 is a side perspective view of one embodiment of the free ends of the present invention.
Figures 3, 4:
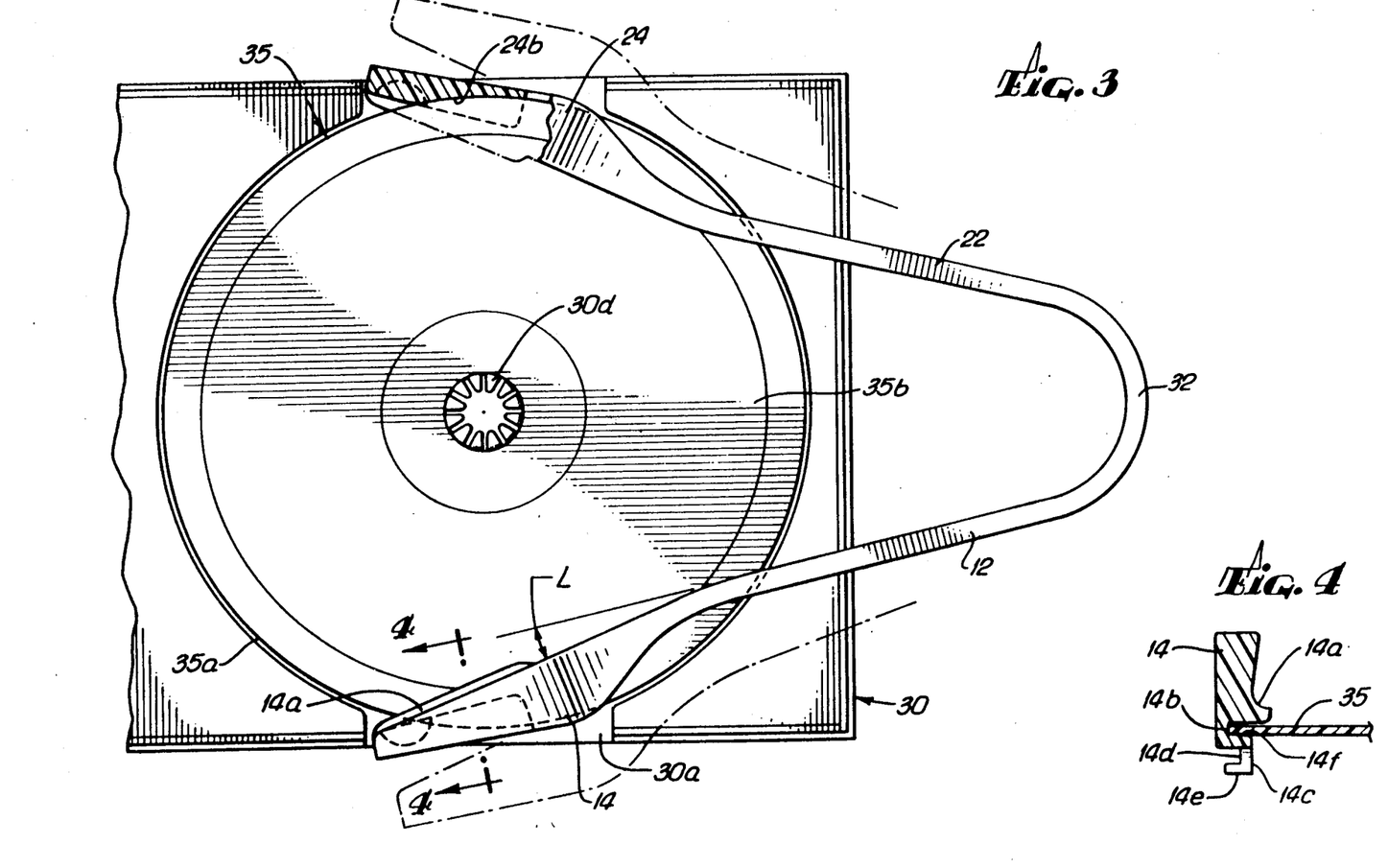
FIG. 3 is a top view of one embodiment of the present invention engaged with the outer disc edge, and in phantom lines, disengaged from the disc edge.
FIG. 4 is a cutaway view taken along line 4—4 of FIG. 3.
Figure 5:
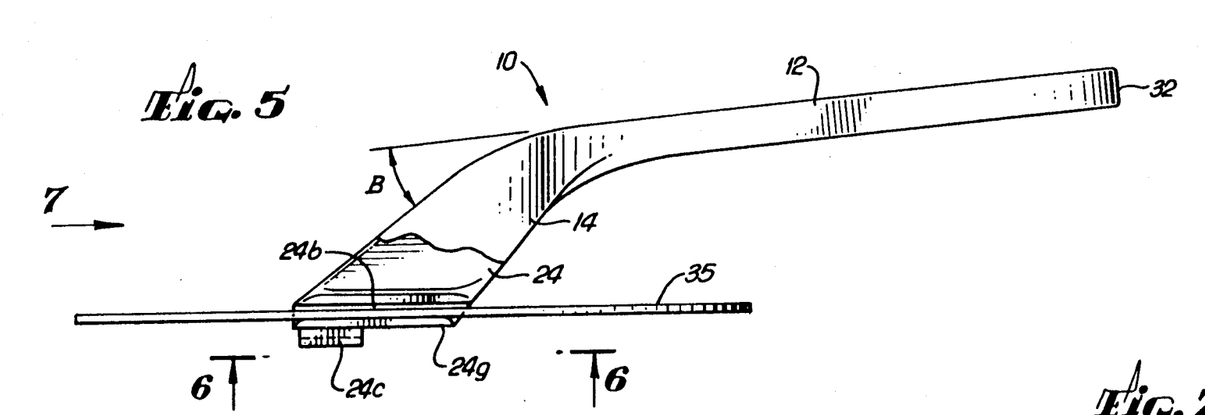
FIG. 5 is a cutaway view of one embodiment of the present invention showing the free end engaging the outer disc edge.
Figure 6:
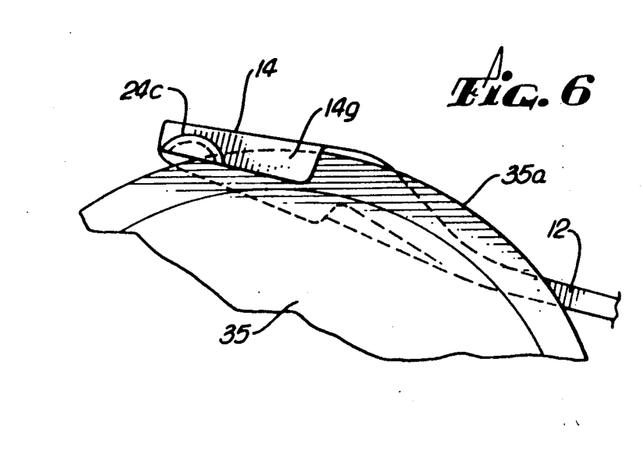
FIG. 6 is a bottom view of the handling device of the present invention along line 6—6 of FIG. 5.
Figure 7:
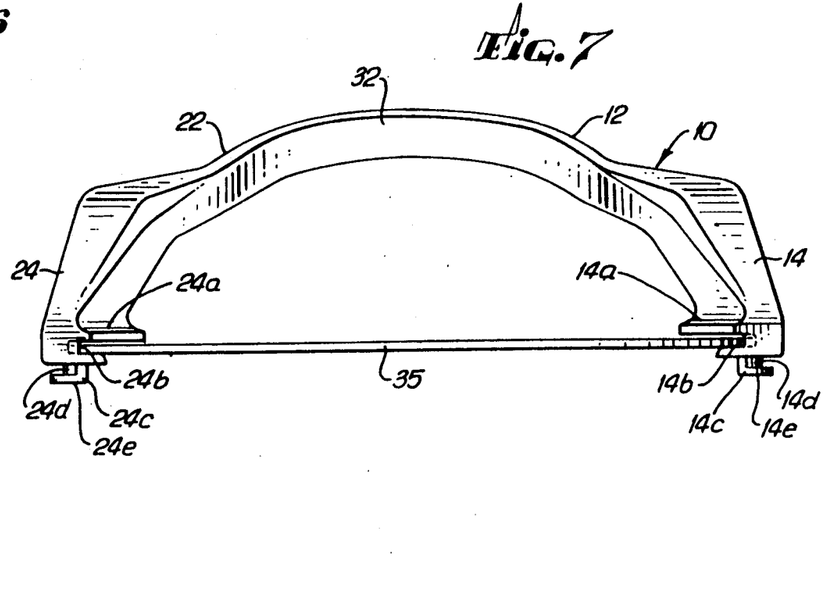
FIG. 7 is a front view of the handlinq device of the present invention engaged with the outer edge of the compact disc.

The present invention is directed to a device for handling compact discs. Referring now to FIGS. 1-7, one preferred embodiment of the present invention generally is designated 10, and includes means for grasping comprising a first flexible arm 12 and a symmetrical second flexible arm 22. Preferably the arms are symmetrical. As shown in FIGS. 3 and 5, each arm is preferably bent out and down at two angles "L" and "B" along the length of each arm, respectively. The arms are generally aligned and oppose one another along their length. They are joined at one end 32.

The arms of the tongs are made of a suitably resilient material, such as spring steel, plastic, aluminum, copper, brass or a composite such as carbon fiber/kevlar/epoxy, glass reinforced thermoplastic or thermoset resin, and preferably injection molded polycarbonate. Dimensions may vary, but in the preferred embodiment, each arm is about 15 cm long.

Figures 11, 12, 13, 14:
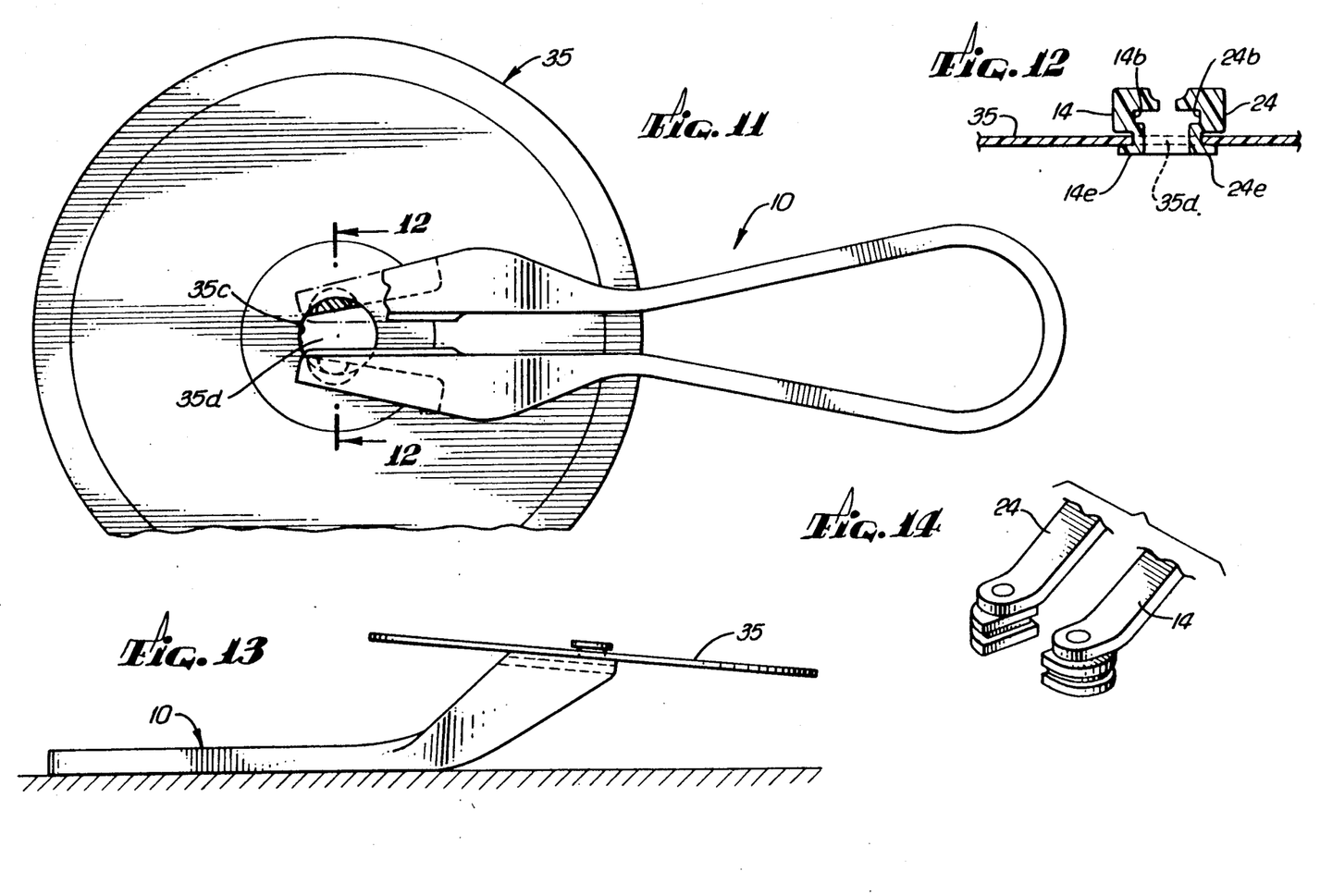
FIG. 11 is a top view of a handling device engaged with the disc as shown in FIG. 10.
FIG. 12 is a cutaway view taken along line 12—12 of FIG. 11.
FIG. 13 shows the handling device of one embodiment of the present invention engaging the disc edge defining the central aperture and showing the handling device resting on its top side.
FIG. 14 is a cut-away perspective view of another embodiment of the free ends of the handling device of the present invention.

At the end of each arm 12 and 22 is a foot 14 and 24, respectively, for facilitating grasping of the disc. An alternative embodiment of the feet is shown in FIG. 14 as discussed below.

Several methods of affixing the feet to the arms are possible such as rivets (which allows the feet to pivot), welding, injection molding, bolts, and the glue. Preferably, the feet and the arms are unitary and molded as one piece, and formed of the same material.

As shown in the Figures, each foot 14, 24 includes a ledge 14a, 24a, a curved first groove 14b, 24b, and a lip 14c, 24c defining a curved second groove 14d, 24d, the lip 14c, 24c, having a bottom pad 14e, 24e. The bottom surface 14f, 24f (NOT SHOWN) defining the groove 14b, 24b is preferably downwardly inclined. The first and second grooves are shown in different planes; however, placing the grooves in the same plane or adding additional grooves in different planes is also within the scope of the present invention.

As shown in the FIGURES, the ledge of the feet allows for a self-registering of the disc to position and lift the disc from the disc box 30 when the tongs are squeezed. By placing the bottom pad 14e, 24e, of the lip 14c, 24c, on a flat surface 30a of the box 30, and squeezing the tongs, the first groove 14b, 24b is placed automatically in registry with a portion of the outer edge 35a of the disc 35. To minimize wobbling when the handling device 10 is used to engage the outer edge of the disc, the first groove 14b, 24b is preferably angled off horizontal such that the rear bottom end of the legs 14g, 24g can rest on the bottom surface 30a of the box (or a flat surface).

The first and second grooves are preferably curved to fit the arc of the disc edges to thereby yield a snug fit with no slippage. Preferably, the groove depth may range from about 0.01 cm to about 0.04 cm, and the groove height may be slightly larger than the thickness of a compact disc.

When unstressed, the feet 14 and 24 of handling device 10 are preferably separated by a distance of approximately 12.5 cm, which is a little larger than the diameter of a standard compact disc 35.

The forward portion 15, 25 of the arms are curved away from the rearward portion 16, 26 of the arms in a curved manner at 17, 27 to make thumb and forefinger handling of the tongs easier and more comfortable.

If the feet are to be used for grasping the disc on both the outer edge and aperture edge, the lips 14c, 24c of the feet must be small enough to fit in the central disc aperture together when the arms of the tongs are brought together as shown in FIGS. 8-12.

In another embodiment as shown in FIG. 14, each of the feet 14 and 24 is generally semicircular having a planar top and bottom, a flat side and a curved side. The feet in this embodiment are connected by rivets to the free ends of the arms. The rivet connection can be tight which places the feet in a fixed position. In such case the groove can run around the entire periphery of the feet. Alternatively, the rivet connection can be loose allowing for the feet to pivot. In such case the groove may run only partway around the periphery of the feet (not shown), and the feet pivoted for alignment of the grooves with the disc edge.

Since the feet 14 and 24 will directly touch the compact disc, the feet are preferably composed of a material such as plastic, rubber, or an elastomer, or the grooves are lined with a soft material such as rubber coating to protect the playing surface.

As shown in FIGS. 1-7, the compact disc 35 normally rests in its storage box 30 where it is protected from being damaged. To transfer the compact disc 35 from its box 30 to a compact disc player, the box is opened and laid upon a flat surface (not shown). The handling device is brought into position such that the pad 14e, 24e and bottom end 14g, 24g are on the flat surface 30a. A portion of the first grooves 14b and 24b are then aligned with a portion of the compact disc edge 35a. The arms 12 and 22 are then squeezed with hand pressure until contact is made, as seen in FIG. 3. Playing surface 35b of the compact disc is left undisturbed. Then, upon depressing the center pole 30d of the disc storage box 30, the compact disc 35 can be lifted up out of its box and held by the handling device 10.

Figures 8, 9, 10:
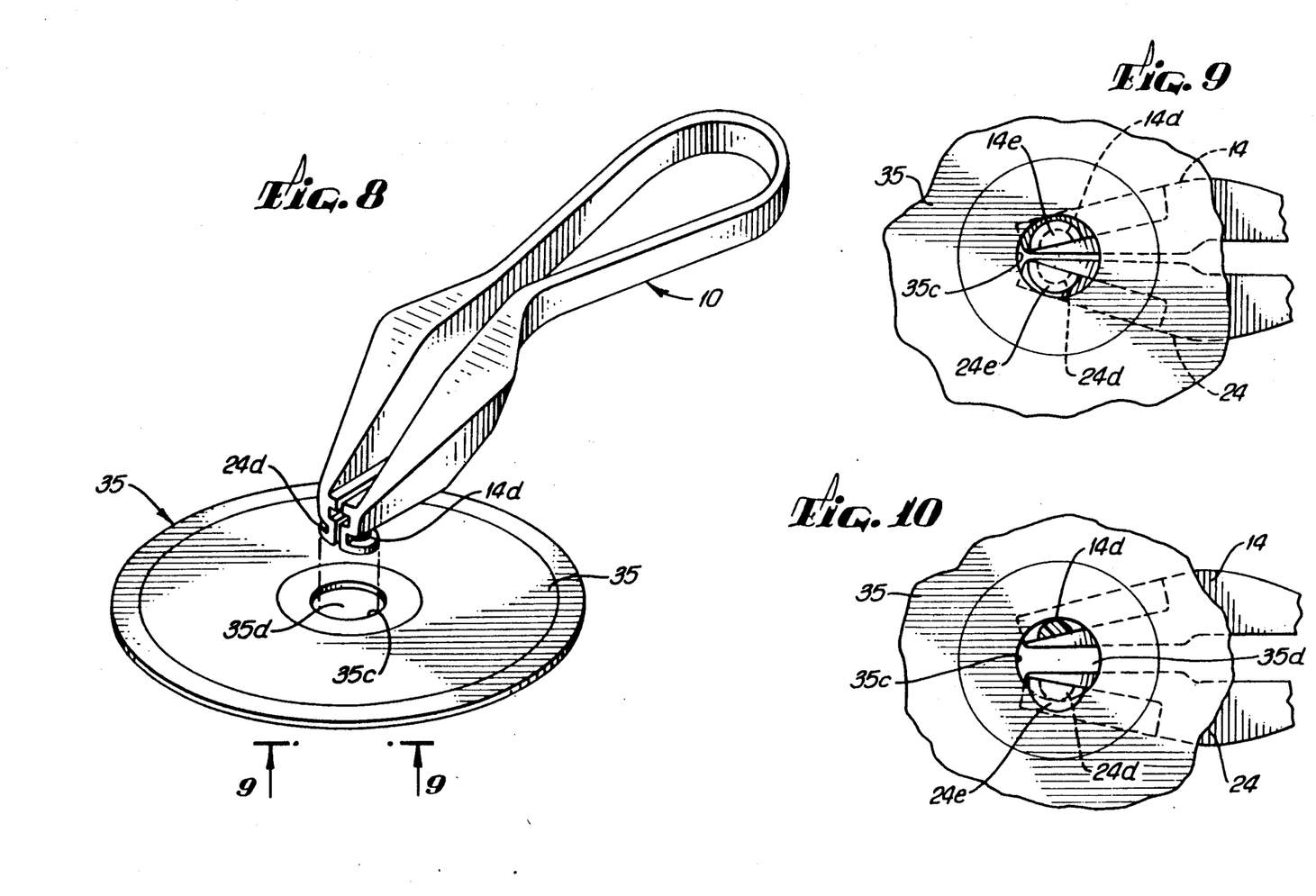
FIG. 8 is a perspective view of the handling device of the present invention shown about to be engaged with the disc edge defining the central disc aperture of a compact disc.
FIG. 9 is a bottom view of the embodiment shown in FIG. 8 with the grooves of the tongs free end positioned to engage the disc edge of the central disc aperture.
FIG. 10 is a bottom view of the embodiment shown in FIG. 8 with the grooves of the tongs free ends engaged with the disc edge of the central disc aperture.

As shown in figures 8-12, to grasp the compact disc from the central aperture [or as the disc rests in a compact disc player carousel (not shown)], the handling device 10 can be squeezed tightly so that feet 14 and 24 come closely adjacent to each other. The feet are then placed above the compact disc aperture 35d (FIG. 8). A portion of second grooves 14d, 24d are aligned with a portion of the edge 35c of the compact disc defining the aperture 35d (FIG. 9) and then pressure on the arms is released (FIG. 10). The resiliency of arms 12 and 22 forces feet 14 and 24 outward to separate further from each other, keeping the feet in tight contact with the compact disc edge 35c, as best shown in FIGS. 10-12. The compact disc can then be lifted out of the player.

To remove the handling device from the disc, squeezing pressure is applied to arms 12 and 22, the combined feet 14 and 24 are brought closely adjacent to each other (FIG. 9) and removed from the disc aperture (FIG. 8) and the compact disc is released.

It should be appreciated that the tong arms 12 and 22 may be one piece or may be connected together by a spring mechanism (not shown) to facilitate the grasping action described above or to facilitate locking of the arms in a fixed position relative to each other.

In an alternative embodiment of the present invention, the feet may be composed of a material, or the feet may have an outer surface composed of a material, which generally does not have a groove, but which when pressed against a disc edge forms a groove. For example, the feet may be comprised of a rubber, or the feet may be comprised of a hard center core surrounded by a sponge like material or elastomer, which when pressed against the disc edges forms a groove.

Figure 15:
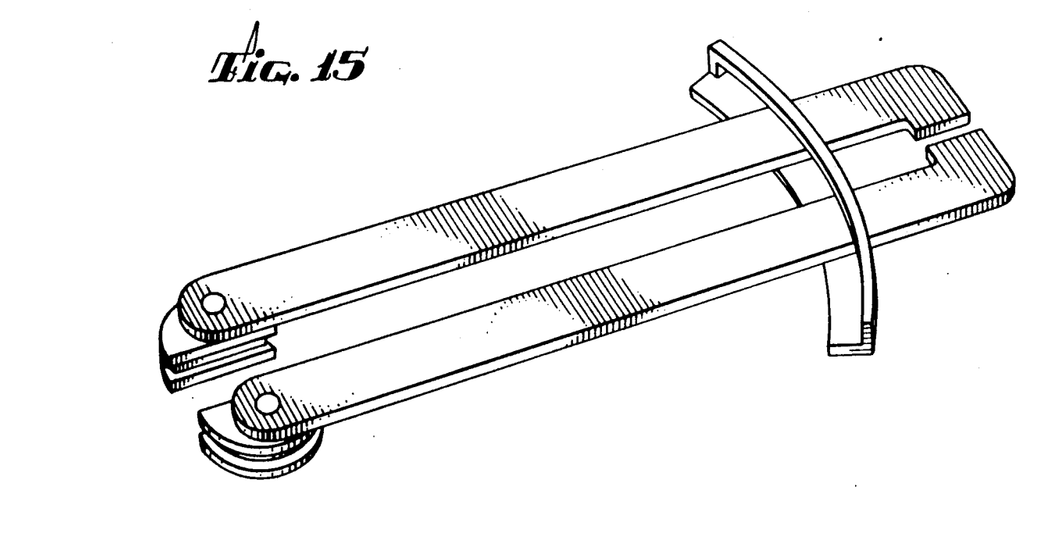
FIG. 15 is a perspective view of another embodiment of the present invention.
Figure 16:
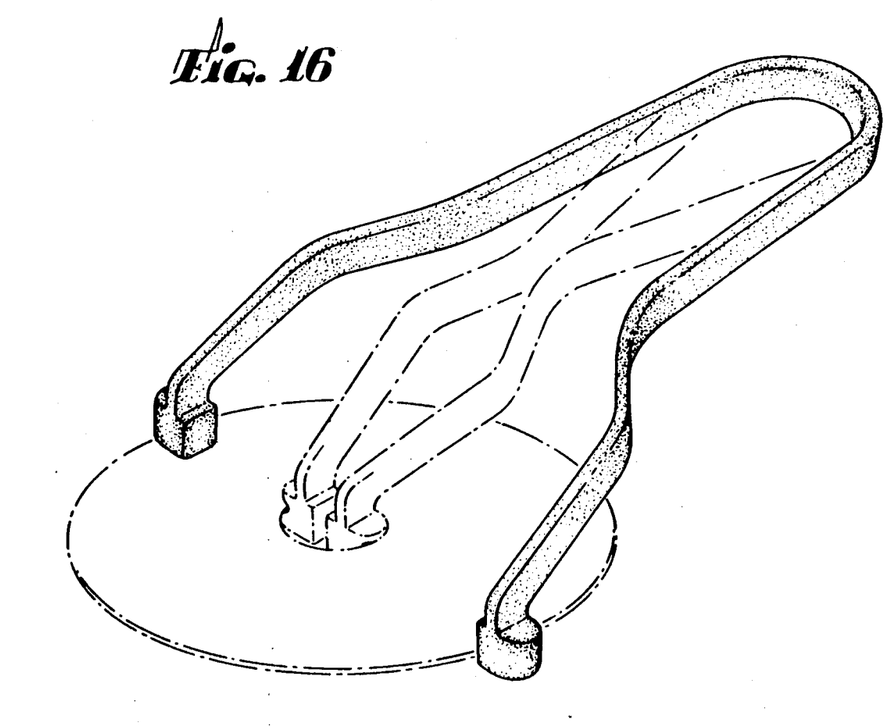
FIG. 16 is a perspective view of another embodiment of the present invention.

In yet another alternative embodiment of the present invention, and as shown in FIG. 15, the feet can be connected to the arms of the tongs by a mechanism for swiveling or in other words means for swiveling the feet about the free ends of the arms of the tongs. In such case, first and second grooves may not be necessary. That is, the feet can include a single groove in the same plane. The feet can then be appropriately positioned by the swivel means to engage the selected disc edge.

In yet another embodiment of the present invention, and as shown in FIG. 15, the handling device might include two arms connected to each other and slidable with respect to each other, with each such arm having connected at its free end a grooved body. The arms might also be connected to each other such that they move relative to each other in at least two fixed positions.

As is apparent from the foregoing specification, the present invention is capable of being embodied with various alterations and modifications from those described above. For this reason, it is to be fully understood that all of the foregoing is intended to be merely illustrative and is not intended to limit, in any manner, the scope of the invention as set forth in the following claims.

What is claimed is:

1. A device for handling a disc having an aperture, the disc having an outer edge and an inner edge, each edge of a given thickness, the inner edge defining the aperture, the device including:
   a first flexible arm having a free end;
   a second flexible arm attached to the first flexible arm and having a free end; and
   receiving means, attached to the free end of the first and second flexible arms, for selectively receiving and encompassing one of the outer edge of the disc and the inner edge defining the aperture of the disc, wherein said receiving means comprises, in said free end of each said flexible arm, first and second grooves which are substantially parallel to one another, said first groove being oriented to encompass the outer edge of the disc and said second groove being oriented to encompass the inner edge of the disc, and said receiving means are dimensioned to both fit into the disc aperture.

2. A device according to claim 1, wherein the first and second arms are opposed to one another.

3. A device according to claim 2, wherein the arms are positioned such that, upon being squeezed with hand pressure, the receiving means can receive and encompass the outer edge of the disc.

4. A device according to claim 3, wherein upon being squeezed with hand pressure, the receiving means can be inserted into the disc aperture and wherein, upon releasing pressure, the receiving means can receive and encompass the inner edge defining the aperture of the disc.

5. A device according to claim 4, wherein the receiving means comprises a first semicircular body having a flat side and a curved side.

6. A device according to claim 5 further including a second body having a flat and a curved side, wherein, when the arms are squeezed, the first and second bodies can pass together through the disc aperture.

7. A device for handling a disc having an aperture, the disc having an outer edge and an inner edge, each edge of a given thickness, the inner edge defining the aperture, the device including:
   a first flexible arm having a free end;
   a second flexible arm attached and opposed to the first flexible arm and having a free end; and
   receiving means, attached to the free end of the first and second flexible arms, for selectively receiving and encompassing a respective one of the outer edge of the disc and the inner edge defining the aperture of the disc;
   wherein the arms are positioned such that, upon being squeezed with hand pressure, the receiving means can receive and encompass the outer edge of the disc;
   wherein upon being squeezed with hand pressure, the receiving means can be inserted into the disc aperture and wherein, upon releasing pressure, the receiving means can receive and encompass the inner edge defining the aperture of the disc;
   wherein the receiving means comprises first and second semicircular bodies, each body having a flat side and a curved side; and wherein each body includes a groove having a first groove portion extending in the flat side and a second groove portion extending in the curved side in the same plane as the first groove portion.

8. A handling device comprising a pair of tongs for handling discs having an aperture and outer and inner edges of a given thickness, the inner edge defining the aperture, the tongs comprising:
two arms, each having a free end; and
a body attached to each free end, each body having a pair of grooves, each groove having an opening at least as wide as the thickness of the disc edges for receiving a disc edge therein, wherein the grooves of each pair of grooves are substantially parallel to one another and said free ends are dimensioned to both fit into the disc aperture, and wherein each body has a semi-circular cross section and the grooves are in the plane of the cross section.

9. A handling device comprising a pair of tongs for handling discs having an aperture and outer and inner edges of a given thickness, the inner edge defining the aperture, the tongs comprising:
two arms, each having a free end; and
a body attached to each free end, each body having a pair of grooves, each groove having an opening at least as wide as the thickness of the disc edges for receiving a disc edge therein, wherein the grooves of each pair of grooves are substantially parallel to one another and said free ends are dimensioned to both fit into the disc aperture, and wherein the grooves are continuous and encircle each body.

10. A compact disc handling device for a disc having an outer edge and an inner edge defining an aperture in the disc, the device comprising a pair of tongs having two arms, each arm having a free end, there being adjacent the free end of each arm a body comprising a resilient material positioned to press against the outer edge of the disc and a resilient material positioned to press against the inner edge of the disc, which material, in a first state is ungrooved and which, in a second state is grooved, wherein the resilient material of each body is in the second state upon pressing the resilient material against an associated disc edge to form a depression in the resilient material, wherein said bodies adjacent said free ends of said arms are dimensioned to both fit into the disc aperture, and wherein the body and the tongs are one piece.

11. A disc handling device for handling discs having an aperture and outer and inner edges of a given thickness, the inner edge defining the aperture, the device comprising a pair of opposed arms having free ends, there being opposed grooves in each of the free ends, each free end provided with a first groove portion having an opening at least as wide as the thickness of the outer edge, for receiving the outer edge therein, and each free end further having a second groove portion having an opening at least as wide as the thickness of the inner edge, for receiving the inner edge therein, wherein said first and second groove portions in each said free end are constituted by grooves which are substantially parallel to one another and said free ends are dimensioned to both fit into the disc aperture.

12. A disc handling device according to claim 11 wherein one pair of opposed grooves opens outwardly and the other pair of opposed grooves opens inwardly.

13. A disc handling device for handling discs having an aperture and outer and inner edges of a given thickness, the inner edge defining the aperture, the device comprising two arms each having a free end, each free end having a grooved body defining a first groove having an opening provided with a width at least as great as the thickness of the disc outer edge for receiving the disc outer edge therein, and a second groove parallel to the first groove having an opening provided with a width at least as great as the thickness of the disc inner edge for receiving the disc inner edge therein, the free ends being dimensioned to both fit into the disc aperture, and the arms being slidable with respect to each other such that the grooves are positioned adjacent to each other but opposed in two fixed positions.

14. A device for handling a disc, the disc having an aperture, an outer edge of a given thickness and an inner edge of a given thickness, the inner edge defining the aperture, the device including:
a first arm having a free end;
a second arm attached to the first arm and having a free end; and
first and second grooved bodies, attached to the free ends of the first and second arms, respectively, each grooved body defining a first groove portion having an opening at least as wide as the thickness of the outer edge, for receiving the outer edge therein, and a second groove portion having an opening at least as wide as the thickness of the inner edge, for receiving the inner edge therein;
wherein said first and second groove portions in each said grooved body are constituted by grooves which are substantially parallel to one another;
wherein the arms are positioned such that, upon the disc being placed between the arms and upon the arms being squeezed with hand pressure, the outer edge of the disc is received within the first groove portion of each grooved body; and
wherein the grooved bodies are dimensioned such that upon the arms being squeezed with hand pressure, the grooved bodies are insertable into the disc aperture and wherein, upon releasing pressure, the inner edge of the disc is received within the second groove portion of each grooved body.

15. A device for handling a disc having an aperture, the disc having an outer edge and an inner edge, each edge being of a given thickness and the inner edge defining the aperture, the device including:
a first flexible arm having a free end;
a second flexible arm attached to the first flexible arm and having a free end; and
receiving means attached to the free end of each of the first and second flexible arms for selectively receiving and encompassing one of the outer edge of the disc and the inner edge defining the aperture of the disc, receiving and encompassing the outer edge being effected by squeezing said arms with hand pressure, and receiving and encompassing the inner edge being effected by squeezing said arms with hand pressure, inserting the receiving means into the aperture, and releasing the hand pressure, and
wherein said receiving means comprises a first semi-circular body carried by said free end of said first flexible arm and having a flat side and a carved side.

16. A device according to claim 15 wherein said receiving means further comprises a second body having a flat and a curved side, wherein, when the arms are squeezed, the first and second bodies can pass together through the disc aperture.

17. A device for handling a disc having an aperture, the disc having an outer edge and an inner edge, each edge being of a given thickness and the inner edge defining the aperture, the device including:
- a first flexible arm having a free end;
- a second flexible arm attached to the first flexible arm and having a free end; and
- receiving means attached to the free end of each of the first and second flexible arms for selectively receiving and encompassing one of the outer edge of the disc and the inner edge defining the aperture of the disc, receiving and encompassing the outer edge being effected by squeezing said arms with hand pressure, and receiving and encompassing the inner edge being effected by squeezing said arms with hand pressure, inserting the receiving means into the aperture, and releasing the hand pressure, and
- wherein said receiving means are pivotally connected to said arms.

* * * * *